(12) United States Patent
Inui et al.

(10) Patent No.: US 8,785,340 B2
(45) Date of Patent: Jul. 22, 2014

(54) CATALYST EXHIBITING HYDROGEN SPILLOVER EFFECT

(75) Inventors: Tomoyuki Inui, Dhahran (SA); Masayuki Inui, legal representative, Kizugawa (JP); Takuma Kimura, Ichihara (JP); Mohammad Abdullah Al-Saleh, Dhahran (SA); Halim Hamid Redhwi, Dhahran (SA); Mohammad Ashraf Ali, Dhahran (SA); Shakeel Ahmed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/278,130

(22) Filed: Oct. 20, 2011

(65) Prior Publication Data
US 2012/0040820 A1 Feb. 16, 2012

Related U.S. Application Data

(63) Continuation of application No. 12/382,737, filed on Mar. 23, 2009, now abandoned.

(51) Int. Cl.
*B01J 31/00* (2006.01)
*C07C 27/00* (2006.01)

(52) U.S. Cl.
USPC .............. 502/11; 502/102; 502/103; 502/104; 502/113; 518/717

(58) Field of Classification Search
None
See application file for complete search history.

(56) References Cited

U.S. PATENT DOCUMENTS

| | | |
|---|---|---|
| 4,097,365 A | 6/1978 | Ward |
| 4,384,981 A | 5/1983 | Dines et al. |
| 4,520,128 A | 5/1985 | Morales et al. |
| 4,579,649 A | 4/1986 | Morales et al. |
| 4,588,709 A | 5/1986 | Morales et al. |
| 4,652,545 A | 3/1987 | Lindsley et al. |
| 4,670,132 A | 6/1987 | Arias et al. |
| 4,686,030 A | 8/1987 | Ward |
| 4,743,574 A | 5/1988 | Morales et al. |
| 4,886,582 A | 12/1989 | Simpson |
| 5,047,142 A | 9/1991 | Sherwood, Jr. et al. |
| 5,068,025 A | 11/1991 | Bhan |

(Continued)

OTHER PUBLICATIONS

Pd—Rh promoted Co/HPS catalysts for Heavy Oil Upgrading. M.M. Hossain et al. (Applied catalysis A: General 278 (2004) 65-71.*

(Continued)

*Primary Examiner* — Melvin C Mayes
*Assistant Examiner* — Colette Nguyen
(74) *Attorney, Agent, or Firm* — Richard C. Litman

(57) ABSTRACT

The catalyst exhibiting hydrogen spillover effect relates to the composition of a catalyst exhibiting hydrogen spillover effect and to a process for preparing the catalyst. The catalyst has a reduced transition base metal of Group VIB or Group VIIIB, such as cobalt, nickel, molybdenum or tungsten, supported on a high porous carrier, such as saponite, the base metal being ion-exchanged with at least one precious metal of Group VIIIB. The process includes the steps of loading the base metal onto the support, reducing the base metal, preferably with $H_2$ at 600° C., and thereafter ion-exchanging the precious metal with the base metal. Preferred examples of the catalyst include a saponite support loaded with about 10-20 wt % cobalt and about 0.1-1 wt % precious metal. The catalyst is optimized for reactions that occur in commercial processes at about 360-400° C., such as in hydrocracking.

3 Claims, 2 Drawing Sheets

(56) References Cited

U.S. PATENT DOCUMENTS

| | | | |
|---|---|---|---|
| 5,135,643 | A | 8/1992 | Ward |
| 5,246,569 | A | 9/1993 | Heinerman et al. |
| 5,574,189 | A | 11/1996 | Vedage et al. |
| 5,616,530 | A | 4/1997 | Sherwood, Jr. et al. |
| 6,024,935 | A | 2/2000 | Mills et al. |
| 6,060,423 | A | 5/2000 | Chen et al. |
| 6,822,008 | B2 | 11/2004 | Srinivasan et al. |
| 7,056,857 | B2 | 6/2006 | Srinivasan et al. |
| 2004/0048937 | A1* | 3/2004 | Srinivasan et al. ............ 518/726 |
| 2004/0166056 | A1 | 8/2004 | Eyman et al. |

OTHER PUBLICATIONS

Hydrogen spillover effects on Pt—Rh modified Co-clay catalyst for heavy oiul upgrading. M.A. Al-Saleh et al. (Applied Caalysis: General 253 (20030 453-459.*

Hydrogen Spillover Phenomenon in Noble Metal Modified Clay-Based Hydro Cracking Catalyst. by Ail et al. Applied catalysts (2002) 63-72.*

"Selective Hydrogenation of Cinnamaldehyde With Pt and Pt—Fe Catalysts: Effects of the Support," A.B. daSilva et al., *Braz. J. Chem. Eng.*, vol. 15, No. 2 (Jun. 1998), pp. 140-144.

"Hydrogen spillover phenomenon in noble metal modified clay-based hydrocracking catalysis," M. Ali et al., *Applied Catalysis A: General*, vol. 277, Issues 1-2, (Mar. 2002), pp. 63-72.

Al-Saleh et al., "Hydrogen spillover effects on Pt—Rh modified Co-clay catalysts for heavy oil upgrading," Applied Catalysis A: General, 253 (2003), pp. 453-459.

Hossain et al., "Pd—Rh promoted Co/HPS catalysts for heavy oil upgrading," Applied Catalysis A: General, 278 (2004), pp. 65-71.

Jones et al., "Temperature-Programmed Reduction for Solid Materials Characterization," Marcel Dekker, Inc., pp. 31-34, 48-51, 78, and 171.

Khodakov, "Enhancing Cobalt Dispersion in Supported Fischer-Tropsch Catalysts Via Controlled Decomposition of Cobalt Precursors," Brazilian Journal of Physics, vol. 39, No. 1A, (2009), pp. 171-175.

Kirk-Othmer Concise Encyclopedia of Chemical Technology, Martin Grayson, ed., John Wiley & Sons, Inc., (1985), p. 665.

W.L. Leffler, Petroleum Refining in Nontechnical Language, 3rd ed., Pennwell Corporation (200), pp. 119-124.

Magee et al., Petroleum Catalysis in Nontechnical Language, Pennwell Publishing Company (1998), pp. 133-141.

* cited by examiner

CATALYST EXHIBITING HYDROGEN SPILLOVER EFFECT

CROSS REFERENCE TO RELATED APPLICATION

This application is a continuation of application Ser. No. 12/382,737, filed Mar. 23, 2009, now abandoned.

BACKGROUND OF THE INVENTION

1. Field of the Invention

The present invention relates to catalysts used for hydrocracking, hydrodesulfurization, hydrodenitrogenation, transalkylation, disproportionation, hydrogenation, and alkylation, and particularly to a catalyst exhibiting hydrogen spillover effect to enhance catalytic efficiency.

2. Description of the Related Art

Many organic reactions require the addition of hydrogen, particularly in petroleum refining. Hydrocracking, for example, is a process that is used to produce gasoline, diesel fuel, and jet fuel from aromatic feedstocks. The process requires the addition of hydrogen at high pressure to add hydrogen to aromatic centers, and an acid-catalyzed cracking of paraffinic side chains on the aromatic molecules. In addition, nitrogen and sulfur must be removed from the feedstock to avoid acid-base reactions with the acid catalyst used to crack the paraffinic side chains. This is typically accomplished by hydrodenitrogenation (adding hydrogen to the feedstock before introduction to the cracking reactor) to form ammonia) and hydrodesulfurization (adding hydrogen to the feedstock before introduction to the cracking reactor to form hydrogen sulfide).

Nevertheless, molecular hydrogen is not very reactive. In order to speed the reaction, hydrocracking reactors use a catalyst to break the molecular hydrogen down to atomic hydrogen. The catalyst used to activate the hydrogen is generally a metal, which may be a noble or precious metal, or may be molybdenum, tungsten, nickel, iron, or the like. The catalyst for a hydrocracking reactor is typically an acidic zeolite bed loaded with the metal catalyst.

However, the conventional hydrocracking reactor bed separates the site of activated hydrogen from the acidic cracking sites. It has been noted that some specially constructed beds exhibit an effect known as hydrogen spillover, in which the activated atomic hydrogen spills over into the pores of the support bed. It is thought that this speeds the process of reduction of the aromatic hydrocarbon centers, as well as saturating olefinic side chains. Some catalysts have also been developed to utilize this effect to selectively promote desired reactions, and in the development of hydrogen fuel cells.

Several of the present inventors described a catalyst exhibiting hydrogen spillover effect in an article published in *Applied Catalysis A: General*, Vol. 277, Issues 1-2, pp. 63-72 in March 2002, which is hereby incorporated by reference. The catalyst described therein generally comprised a smectite clay having rhodium impregnated over the clay by incipient wetness method, which was then ion-exchanged with cobalt nitrate to produce a clay catalyst having 20 wt % CoO and 1 wt % rhodium. The catalyst was compared to a similar catalyst without the noble metal and to a commercial hydrocracking catalyst by a procedure known as Temperature-Programmed Reduction (TPR), which measures the total amount of hydrogen consumed as a function of temperature, and which allows calculation of the degree of reduction and the temperature at which different species are reduced. TPR is a technique sometimes used to measure hydrogenation and hydrogen spillover effects. See "Selective Hydrogenation of Cinnamaldehyde With Pt and Pt—Fe Catalysts: Effects of the Support," A. B. daSilva et al., *Braz. J. Chem. Eng.*, Vol. 15, No. 2 (1998), pp. 140-144.

Nevertheless, due to the expense of precious or noble metals and the need to moderate temperatures in various organic reactions, such as those taking place during hydrocracking, there is a need to obtain greater efficiency in catalysts exhibiting hydrogen spillover effect.

None of the above publications, taken either singly or in combination, is seen to describe the instant invention as claimed. Thus, a catalyst exhibiting hydrogen spillover effect solving the aforementioned problems is desired.

SUMMARY OF THE INVENTION

The catalyst exhibiting hydrogen spillover effect relates to the composition of a catalyst exhibiting hydrogen spillover effect and to a process for preparing the catalyst. The catalyst has a reduced transition base metal of Group VIB or Group VIIIB, such as cobalt, nickel, molybdenum or tungsten, or an oxide or sulfide thereof, supported on a high porous carrier, such as saponite, the base metal being ion-exchanged with at least one precious metal of Group VIIIB. The process includes the steps of loading the base metal on the support, reducing the base metal, preferably with $H_2$ at 600° C., and thereafter ion-exchanging the precious metal with the base metal. Preferred examples of the catalyst include a saponite support loaded with about 10-20 wt % cobalt and about 0.1-1 wt % precious metal. The catalyst is optimized for reactions that occur in commercial processes at about 360-400° C., such as in hydrocracking.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
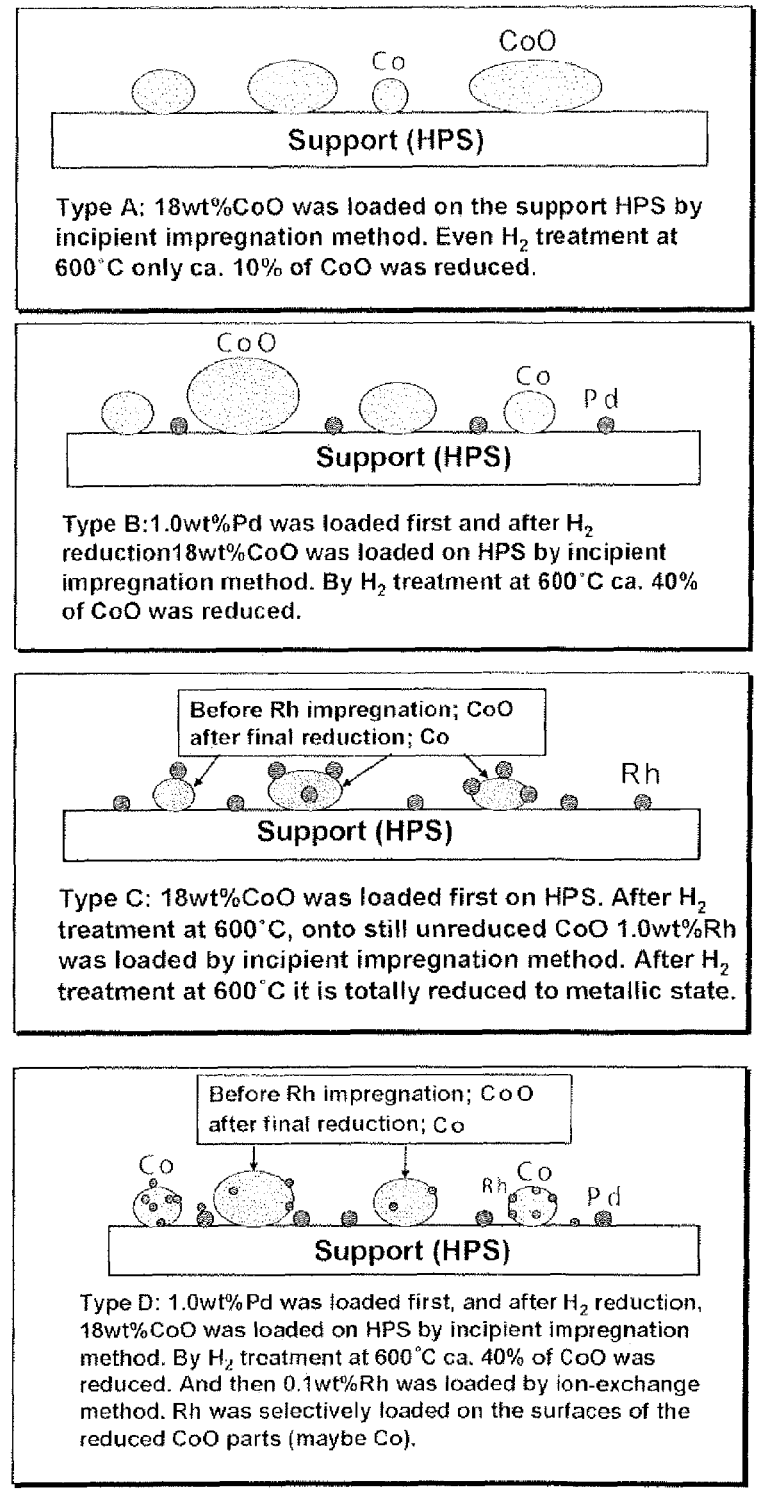
FIG. 1 is a chart diagrammatically illustrating preparation of test catalysts for a catalyst exhibiting hydrogen spillover effect according to the present invention.

The present invention relates to a catalyst exhibiting hydrogen spillover effect and to a process for preparing the catalyst. The catalyst accelerates reactions requiring the addition of hydrogen, including hydrocracking, hydrodesulfurization, hydrodenitrogenation, transalkylation, disproportionation, hydrogenation, and alkylation. Examples are provided that particularly accelerate reactions that are involved in processes occurring between about 360° C. and 400° C.

The catalyst has a reduced transition base metal of Group VIB or Group VIIIB, such as cobalt, nickel, molybdenum or tungsten, or an oxide or sulfide thereof, supported on a high porous carrier, such as magnesium silicate-based clay, preferably saponite, the base metal being ion-exchanged with at least one precious metal of Group VIIIB, preferably rhodium, palladium, and/or platinum. The process includes the steps of loading the base metal on the support, reducing the base metal, preferably with $H_2$ at 600° C., and thereafter ion-exchanging the precious metal with the base metal. Preferred examples of the catalyst include a saponite support loaded with about 10-20 wt % cobalt and about 0.1-1 wt % precious metal. The catalyst is optimized for reactions that occur in commercial processes at about 360-400° C., such as in hydrocracking.

As used herein, the term "reduced" means that at least a portion of the metal ions, metallic salts, or the metal ions deposited on the porous support have been reduced to the metallic state.

More particularly, there is selected a clay support, preferably saponite, and, more preferably, high pore saponite, which has a surface area between 130 and 650 m$^2$/g, preferably between 400 and 600 m$^2$/g, and which has a total pore volume between 0.4 and 0.8 ml/g, preferably between 0.45 and 0.75 ml/g. Preparation of test catalysts exhibiting hydrogen spillover effect was carried out using the saponite clay support loaded with active metals of Group VIII preferably cobalt, rhodium and palladium. These metals are loaded on the support with the specified configuration to achieve the desired hydrogen spillover effects. That is to say, rhodium is selectively loaded by the ion-exchange method onto the main catalyst component cobalt particles and palladium particles, which are located independently from cobalt particles.

The following examples describe preparation of the various test catalysts.

Example 1

Type A

The high pore saponite (HPS) described above was placed in contact with an aqueous solution containing a soluble salt corresponding to the base metal of Group VIII of the Periodic Table, more particularly, cobalt, for a period of between 1 and 5 hours, between 3 and 5 hours being preferable, during which it is desired to deposit cobalt onto the support with the object of obtaining a composition including between 10 and 20% by weight of the base metal of Group VIII on the clay support, based on the dry weight of the final catalyst.

At the end of the specified impregnation time, the clay support, now impregnated with the active metal, that is to say, with the base metal of Group VIII, was filtered, dried in the air circulation oven for a period between 5 and 30 hours, between 8 and 24 hours being preferable, at a temperature between 25° C. and 180° C., between 60° C. and 150° C. being preferable, and finally calcined at a temperature between 400° C. and 700° C., between 450° C. and 650° C. being preferable, for a period between 0.5 and 24 hours, between 1 and 12 hours being preferable, using dry air. H$_2$ treatment at 600° C. was made thereafter, as shown diagrammatically in FIG. 1, but only 10% of the CoO was reduced, as estimated from the TPR tracing 10 of the Type A catalyst shown in FIG. 2. The TPR tracing 10 corresponds to about 18 wt % cobalt oxide deposited on the high porous support (HPS).

Example 2

Type B

The high pore saponite described above was placed in contact with an aqueous solution containing a soluble salt corresponding to the precious metal of Group VIII of the Periodic Table, more particularly, palladium, for a period of between 1 and 5 hours, between 3 and 5 hours being preferable, during which it is desired to deposit palladium onto the support with the object of obtaining a composition including between 1 and 2% by weight of the precious metal Group of Group VIII on the clay support, based on the dry weight of the final catalyst.

At the end of specified impregnation time, the clay support, impregnated with the precious metal of Group VIII, was filtered, dried in the air circulation oven for a period between 5 and 30 hours, between 8 and 24 hours being preferable, at a temperature between 25° C. and 180° C., between 60° C. and 150° C. being preferable, and finally calcined a temperature between 400° C. and 700° C., between 450° C. and 650° C. being preferable, for a period between 0.5 and 24 hours, between 1 and 12 hours being preferable, using dry air. Palladium oxide on the support was reduced to the metallic state.

The saponite based catalyst loaded with palladium was then impregnated with a base metal belonging to Group VIII, more particularly, with cobalt as a soluble salt, to obtain a preferred composition including between 1 and 20% cobalt by weight as the oxide, based on the dry weight of the final catalyst. H$_2$ treatment at 600° C. was made thereafter, the preparation being diagrammatically shown as Type B in FIG. 1. About 40% of the CoO could be reduced by this treatment, as estimated from the TPR tracing 20 of the Type B catalyst shown in FIG. 2. The TPR tracing 20 corresponds to about 18 wt % loaded onto about 1.0 wt % palladium ion-deposited on the high porous support (HPS).

Example 3

Type C

The clay support of high pore saponite described above was placed in contact with an aqueous solution containing a soluble salt corresponding to the base metal of Group VIII of the Periodic Table, namely, with cobalt, for a period of between 1 and 5 hours, between 3 and 5 hours being preferable, during which it is desired to deposit cobalt onto the support with the object of obtaining a composition including between 10 and 20% by weight of the base metal Group of Group VIII on the clay support, based on the dry weight of the final catalyst.

At the end of specified impregnation time, the clay support impregnated with the cobalt was filtered, dried in the air circulation oven for a period between 5 and 30 hours, between 8 and 24 hours being preferable, at a temperature between 25° C. and 180° C., between 60° C. and 150° C. being preferable, and finally calcined a temperature between 400° C. and 700° C., between 450° C. and 650° C. being preferable, for a period of between 0.5 and 24 hours, between 1 and 12 hours being preferable, using dry air. The cobalt-loaded support was treated by H$_2$ at 600° C., but only 10 wt % of CoO was reduced, similar to the result obtained in Type A of Example 1.

The saponite-based catalyst loaded with cobalt oxide was impregnated with a precious metal belonging to Group VIII, namely, with rhodium as a soluble salt, to achieve obtaining a preferred composition including between 0.1 and 1.0% by weight as oxide, based on the dry weight of the final catalyst. H$_2$ treatment at 600° C. was made thereafter, as indicated diagrammatically for the Type C catalyst in FIG. 1. Almost total reduction of CoO occurred, as estimated from the TPR tracing 30 of Type C in FIG. 2, due to the hydrogen spillover effect of rhodium. The TPR tracing 30 corresponds to about 1.0 wt % rhodium ion-exchanged with about 18 wt % cobalt oxide loaded onto the high porous support (HPS).

Example 4

Type D

The clay support of high pore saponite described above was placed in contact with an aqueous solution containing a soluble salt corresponding to the precious metal of Group VIII of the Periodic Table, namely, with palladium, for a period of between 1 and 5 hours, between 3 and 5 hours being preferable, during which it is desired to deposit palladium onto the support with the object of obtaining a composition including between 1 and 2% by weight of the precious metal Group of Group VIII on the clay support, based on the dry weight of the final catalyst.

At the end of the specified impregnation time, the clay support impregnated with the precious metal of Group VIII was filtered, dried in the air circulation oven for a period between 5 and 30 hours, between 8 and 24 hours being preferable, at a temperature between 25° C. and 180° C., between 60° C. and 150° C. being preferable, and finally calcined a temperature between 400° C. and 700° C., between 450° C. and 650° C. being preferable, for a period of between 0.5 and 24 hours, between 1 and 12 hours being preferable, using dry air. The palladium-loaded saponite was reduced by $H_2$ at 600° C. to convert the palladium into the metallic state.

The saponite-based catalyst loaded with palladium was then impregnated with a base metal belonging to Group VIII, namely, cobalt as a soluble salt, to obtain a preferred composition including between 1 and 20% cobalt by weight as the oxide, based on the dry weight of the final catalyst. The palladium and CoO loaded saponite was treated with $H_2$ at 600° C., and about 40% of the CoO was reduced by this treatment.

This was ion-exchanged with a precious metal belonging to Group VIII, namely, with rhodium as a soluble salt at about 0.1 wt %, a composition including between 0.1 and 1.0% by weight as the oxide being preferred, based on the dry weight of the final catalyst. Rhodium was selectively loaded onto the reduced cobalt part, as shown diagrammatically in FIG. 1, and exhibits prominent hydrogen spillover effect. As the result, major parts of the catalyst components could be reduced at just the same temperature range that is preferred in catalytic hydrocracking reactions, as shown by the TPR trace 40 of the Type D catalyst in FIG. 2, The TPR trace 40 corresponds to about 0.1 wt % rhodium ion-exchanged with cobalt and palladium formed by reduction of about 18 wt % cobalt oxide loaded onto about 1.0 wt % palladium loaded onto the high porous support (HPS).

The catalysts prepared in the above-mentioned Examples 1 to 4 were evaluated under the Temperature Programmed Reduction (TPR) technique to determine the temperature at which these catalysts can be reduced to the metallic state under the conditions of the experiments. The procedures for pretreatment and subsequent TPR experiments were as follows. The catalyst sample was pretreated in a quartz tube reactor at about 400° C. maintained for 2 to 4 hours in flowing dry air having 30 to 50 $cm^3$/min rates. The gas mixture used for reduction was 5% $H_2$ in argon. The temperature of the reactor was then increased linearly from room temperature to about 1,100° C. at a heating rate of 10° C./min and then maintained isothermally for 15 minutes. The hydrogen gas consumed with increasing temperature was determined using a thermal conductivity detector.

Figure 2:
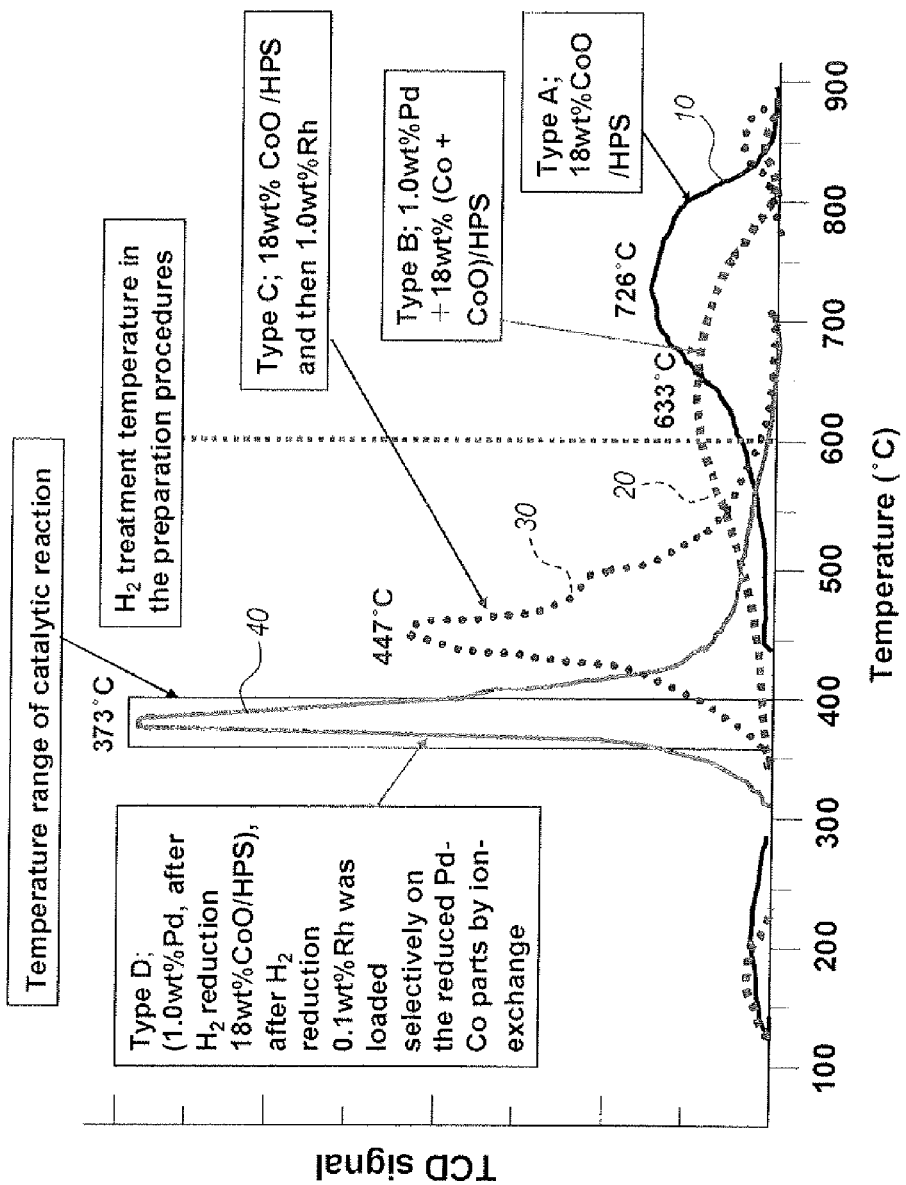
FIG. 2 is a graph showing temperature programmed reduction results for the test catalysts of FIG. 1.

A catalyst expected to exhibit the hydrogen spillover effect can be shown by the decrease in the temperature programmed reduction temperature of the catalysts. This phenomenon is shown in FIG. 2, and the reduction temperature data is given in Table I, below. The data shows a marked decrease in the reduction temperature of the high pore saponite (HPS)-based catalysts having precious metal due to the hydrogen spillover effect.

TABLE I

Comparison of peak temperatures on TPR profiles

| Catalyst Type | Catalyst features | Temp. range of main TPR profile (° C.) | Peak temp. of main profile (° C.) | Decrease in peak temp. from reference (° C.) |
|---|---|---|---|---|
| A | 18 wt % CoO/HPS | 550~850 | 726 | — |
| B | 1.0 wt % Pd + 18 wt % (Co + CoO)/HPS | 380~800 | 633 | 93 |
| C | 18 wt % CoO/HPS and then 1.0 wt % Rh loaded | 380~600 | 447 | 279 |
| D | (1.0 wt % Pd; after $H_2$ reduction, 18 wt % CoO/HPS); after $H_2$ treatment at 600° C., 0.1 wt % Rh was loaded selectively on the reduced CoO parts (may be Co) by ion exchange | 320~460 | 373 | 353 |

In Table I, the initiation temperature and the termination temperature are decided by extrapolation of the profiles of the main ascending and descending curves, respectively.

In the presence of 1.0 wt % Pd on 18 wt % CoO/HPS, the reduction temperature decreased from 726° C. to 633° C. compared by peak temperature of TPR profiles. When 1.0 wt % Rh was loaded on 18 wt % CoO/HPS, the reduction temperature was further decreased to 477° C. This effect of temperature reduction was furthermore exhibited by the loading of only 0.1 wt % Rh onto the 1.0 wt % Pd and 18 wt % (Co+CoO)/HPS catalyst. In this case, reduction temperature was reduced to 373° C., which just coincides with the reaction temperature range desired for hydrocracking reactions.

The TPR traces 30 and 40 show higher, narrower peaks as compared with the TPR traces 10 and 20 of FIG. 2, and as compared to the TPR traces of FIG. 1 at page 67 of the publication *Applied Catalysis A: General*, Vol. 277 (2002), cited above, indicating that the Type C and Type D catalysts produce significantly more efficient hydrogen reduction. In addition, the Type D catalyst produced peak reduction squarely within a preferred temperature range for operating a hydrocracking reactor to catalyze reactions occurring therein.

The process for preparing a catalyst exhibiting hydrogen spillover effect may be said to include the steps of: (a) loading a water soluble salt of a base metal onto a porous support, preferably sufficient to obtain between about 10 wt % to 20 wt % by dry weight of the catalyst; (b) reducing the base metal, preferably with $H_2$ at about 600° C.; and (c) ion-exchanging the base metal with at least one precious metal, preferably to between about 0.1 wt % to 1 wt % by dry weight of the catalyst.

The method may further comprise the steps of loading a first precious metal onto the porous support, preferably to about 1 wt % of the first precious metal in the total dry weight of the catalyst, and reducing the first precious metal, preferably by $H_2$ at about 600° C., prior to step (a), step (c) then comprising ion-exchanging the base metal with a second precious metal to obtain about 0.1% of the second precious metal in the total dry weight of the catalyst. In the foregoing method, the base metal is preferably molybdenum, tungsten, nickel or cobalt, more preferably cobalt, and the precious metal is preferably palladium, rhodium, and/or platinum. The present invention also extends to a catalyst produced by the foregoing process.

It is to be understood that the present invention is not limited to the embodiments described above, but encompasses any and all embodiments within the scope of the following claims.

We claim:

1. A catalyst exhibiting hydrogen spillover effect for hydrocracking aromatic feedstocks, consisting essentially of:
   a porous support made from saponite clay, the porous support having a surface area between 400 and 600 m$^2$/g and a total pore volume between 0.45 and 0.75 ml/g;
   palladium loaded on the porous support, the palladium being reduced by $H_2$ at about 600° C. after being loaded on the porous support, the reduced palladium forming about 1 wt % of the catalyst;
   a base metal impregnated on the reduced palladium-loaded saponite support, the base metal being cobalt and oxides or salts thereof, a portion of the cobalt and oxides or salts thereof being reduced by $H_2$ at about 600° C. after being impregnated on the support; and
   rhodium or water soluble salts or oxides thereof ion-exchanged with the reduced cobalt and oxides or salts thereof and the reduced palladium and forming about 0.1 wt % of the catalyst, wherein the catalyst exhibits maximum hydrogen spillover effect between 360° C. and 400° C.

2. The catalyst according to claim 1, wherein said cobalt comprises between about 10 wt % and about 20 wt % of the catalyst as the reduced metal and oxides or salts thereof.

3. A catalyst exhibiting hydrogen spillover effect for hydrocracking aromatic feedstocks prepared by a process comprising the steps of:
   contacting a high pore saponite support with an aqueous solution of a soluble salt of palladium for a period between one and 5 hours in order to obtain a composition including between 1 and 2% by weight of palladium on the saponite support, based on the dry weight of the final catalyst;
   reducing the palladium by $H_2$ at 600° C.;
   impregnating the palladium-loaded saponite support with a soluble salt of cobalt in order to obtain a composition including between 1% and 20% by weight of cobalt as the oxide thereof, based on the dry weight of the catalyst;
   reducing a portion of the cobalt oxide on the palladium-loaded saponite support by $H_2$ at 600° C.; and
   contacting the partially reduced cobalt-cobalt oxide, reduced palladium-loaded saponite support with a water soluble salt or oxide of rhodium in order to incorporate the rhodium by ion exchange, the rhodium forming about 0.1% by weight of the dry weight of the final catalyst wherein the final catalyst exhibits maximum hydrogen spillover effect between 360° C. and 400° C.

* * * * *